US006699917B2

United States Patent
Takashima

(10) Patent No.: US 6,699,917 B2
(45) Date of Patent: Mar. 2, 2004

(54) LOW IMPACT RESILIENCE POLYURETHANE FORM THAT CONTAINS CARBON POWDER, AND PRODUCING THEREOF

(76) Inventor: Hisato Takashima, 5-18, Kasuga-cho, Takatsuki-shi, Osaka-fu, 569-0053 (JP)

(*) Notice: Subject to any disclaimer, the term of this patent is extended or adjusted under 35 U.S.C. 154(b) by 124 days.

(21) Appl. No.: 09/918,651

(22) Filed: Jul. 30, 2001

(65) Prior Publication Data

US 2002/0037942 A1 Mar. 28, 2002

(30) Foreign Application Priority Data

Aug. 1, 2000 (JP) ........................................ 2000-233148

(51) Int. Cl.[7] ................................................ C08G 18/28
(52) U.S. Cl. .......................... 521/174; 521/99; 521/155; 521/170
(58) Field of Search ........................... 521/99, 155, 170, 521/174

(56) References Cited

U.S. PATENT DOCUMENTS 4,795,763 A * 1/1989 Gluck et al. ................. 521/917

FOREIGN PATENT DOCUMENTS

| JP | 08-183905 | 7/1996 |
|---|---|---|
| JP | 10-165260 | 6/1998 |
| JP | 11-116651 | 4/1999 |
| JP | 11-130833 | 5/1999 |
| JP | 2000-273231 | 10/2000 |
| JP | 2001-061603 | 3/2001 |
| JP | 2001-302752 | 10/2001 |

* cited by examiner

*Primary Examiner*—John M. Cooney, Jr.
(74) *Attorney, Agent, or Firm*—Curtis L. Harrington

(57) ABSTRACT

The present invention relates to low impact resilience polyurethane form that has excellent deodorization property, hygroscopicity and contained carbon powder does not fall because the carbon powder of wide scope grading is dispersed and maintained in low impact resilience polyurethane form, and suitable producing of this low impact resilience polyurethane form; producing of low impact resilience polyurethane form that low impact resilience polyurethane form that carbon powder is dispersed and maintained, isocyanate ingredient and polyol ingredient that carbon powder which has over 1 µm particle diameter is dispersed previously are molded after blended, heated and foamed, and producing of low impact resilience polyurethane form that isocyanate ingredient, polyol ingredient and carbon powder which has 0.01~1 µm particle diameter are molded after blended simultaneously, heated and foamed.

17 Claims, 2 Drawing Sheets

LOW IMPACT RESILIENCE POLYURETHANE FORM THAT CONTAINS CARBON POWDER, AND PRODUCING THEREOF

FIELD OF THE INVENTION

The present invention relates to low impact resilience polyurethane form that contains carbon powder and producing thereof, and the purpose of invention is to provide the low impact resilience polyurethane form and suitable producing of this low impact resilience polyurethane form wherein the carbon powder that has a wide scope of particle diameter is dispersed and maintained in low impact resilience polyurethane form, so it has excellent deodorization property and hygroscopicity, and the contained carbon powder does not fall.

Also, meaning of low impact resilience in present invention is that impact resilience percentage calculated based on JIS K 6401 is below 30%. In this specification, carbon powder is meaning charcoal powder and/or carbon black.

DESCRIPTION OF THE RELATED ART

Polyurethane form is used in a broad field as bedding such as a mattress and a pillow, cushion material such as a chair for home use and a sheet for car use, a sole of a shoe and an insole, or a floor material and wall material.

In the case of the polyurethane form used as bedding such as a mattress and a pillow, cushion material such as a chair for home use and a sheet for car use, a sole of a shoe and an insole, it is used in condition of directly touching with user, so the user's sweat, and humidity in circumstance of high temperature and humidity especially summer, causes an offensive odor and becomes moist. Further under such circumstance, a tick and mold tend to cause easily, because of the user touched the polyurethane form directly, it is not desirable in sanitary.

Also, in the case of the polyurethane form is used as a floor material and wall material, essentially such places tended to be poorly ventilated and became moist so it caused a tick and mold easily. Thus, adding function of deodrization property and hygroscopicity to polyurethane form is done since before.

The present applicant disclosed cushion material that contained carbon powder in polyurethane form and its producing in Japan patent application number Tokuganhei 8-325780 that was applied first. This invention formed polyurethane form that the carbon powder was dispersed by blending 50~500 μm carbon powder at the same time and foaming when isocyanate ingredient and polyorl ingredient were blended.

However, in the polyurethane form that contained carbon powder as usual as mentioned above, there existed problems as follow.

That is, a particle diameter of carbon powder that could be used was limited to 50~500 μm, and it could not contain the carbon powder when the particle diameter of carbon powder was below 50 μm or over 500 μm. Thus, compounded particle diameter of carbon powder became long, and this caused the result that deodrization property and hygroscopicity declined. Also, in the case of the particle diameter was over 500 μm, carbon powder was inferior to dispersing property. Thus, in the case of using the carbon powder that had particle diameter over 500 μm, as shown in section view of polyurethane form as usual that contains carbon powder in FIG. 2, carbon powder (3) was dispersed in polyurethane form (2), was not maintained and clustered in a section, and sometimes it was fallen from the polyurethane form (2).

The solution subject of the present invention is to provide low impact resilience polyurethane form and suitable producing of this low impact resilience polyurethane form wherein carbon powder that has a wide scope of particle diameter is dispersed and maintained in low impact resilience polyurethane form, so it has suitable deodorization property and hygroscopicity, and the contained carbon powder does not fall.

DESCRIPTION OF PREFERRED EMBODIMENT OF THE INVENTION

Figure 1:
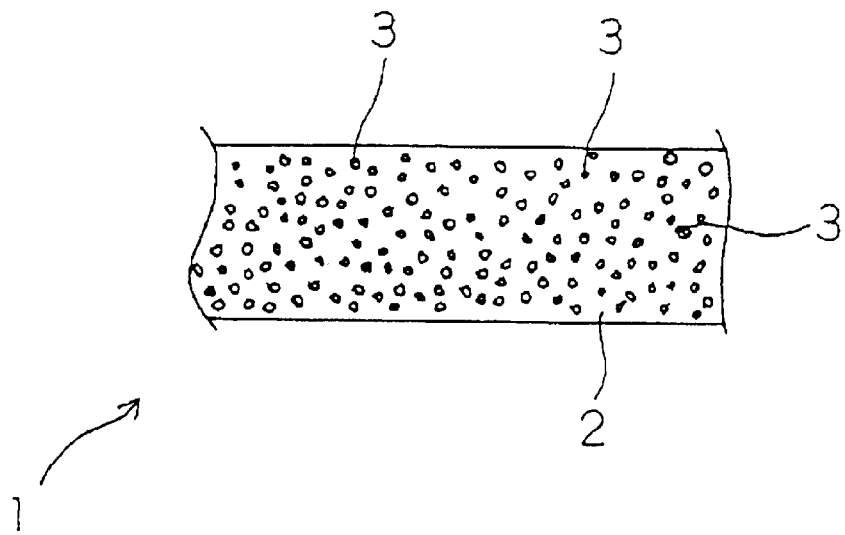
FIG. 1 is a section view of low impact resilience polyurethane form that contains carbon powder and relates to present invention.

The feature of low impact resilience polyurethane form that contains carbon powder and relates to the present invention is the carbon powder is dispersed and maintained in polyurethane form. The carbon powder is meant charcoal powder and/or carbon black. In particularly, at least, the feature is that carbon powde is dispersed and maintained in low impact resilience polyurethane form that is formed from polyol ingredient, isocyanate ingredient, a foaming agent and a catalyst. The low impact resilience polyurethane form that contains carbon powder and relates to the present invention will be explained with referring to figures as follows.

The low impact resilience polyurethane form that contains carbon powder and relates to the present invention is formed at least polyorl ingredient, isocyanate ingredient, a foaming agent and a catalyst.

As long as used in producing of low impact resilience polyurethane form, polyol ingredient can use any polyol ingredient. In particularly, it can explain polyetherpolyol that ethylene glycol, propylene glycol, diethylene glycol, dipropylene glycol, water, glycerol, trimethylolpropane, 1,2, 6-hexane triol, triethanolamine, pentaerythritolethylenediamine, triresinamine, diphenylmethanediamine, tetramethylolcyclohexane, methylglucoside, 2,2,6,6-tetrakis(hydroxylmethyl) cyclohexanol, diethlenetriamine, sorbitol, mannitol, dusiltol and sucrose are linked by epoxiside such as propylene oxide, ethylene oxide and butylene oxide, or modification of these such as graft polyol, polyurea dispersion polyol and amine modification polyol, or polytetramethyleneetherglycol that is gained by polymerizing of tetrahydrofuran, or polyester polyol that is gained by condensation polymerization of more than one kind of polyhydric alcohol such as ethylene glycol, diethylene glycol, propylene glycol, 1,4-butanediol, 1,5-pentanediol, methyl pentanediol, 1,6-hexanediol, trimethlolpropane, glycerol, pentaerythritol, diglycerol, dextlos and sorbitol and more than one kind of dibasic acid such as oxalic acid, malonic acid, succinic acid, adipic acid, sebacic acid and dimer acid, and other such as polycaprolactone polyol, aromaticpolyester polyol, polycarbonate polyol. In present invention, it can use only one kind of said polyol ingredient, also it can use by blending more than two kinds of said polyol ingredient.

Especially, in present invention, as polyol ingredient, to use blend of polyol that average functional base is 2~4 and Hydroxyl value is 30~60 mg KOH/g and average functional base is 2~4 and Hydroxyl value is 200~270 mg KOH/g is desirable. The compound quantity of the former polyol and the later polyol are not restricted particularly, it is better to compound polyol so that the former polyol is 34~75 weight % and the later polyol is 25~66 weight %. Said polyol can be used for these polyol, but to use polyehter polyol, polymer polyol, polyester polyol or blend of these is desirable.

In particularly, as polyol of average functional base is 2~4 and Hydroxyl value is 30~60 mg KOH/g, it can explain Boranol V 3022 J (a brand name) made by Dow Polyurethane Nihon Inc. As polyol of average functional base is 2~4 and Hydroxyl value is 200~270 mg KOH/g, it can explain MN 700 (a brand name) made by Mitui Takeda chemical Inc.

As long as used in producing of polyurethane form, isocyanate ingredient can use any isocyanate ingredient. For example, it can explain ahpfaticpolyisocyanate, such as hexamethylenediisocyanate, trimethylhexamethylenediisocyanate, isoholondiisocyanate, dicyclohexylmethanediisocyanate, cyclohexyldiisocyanate, lysindiisocyanate and methylcyclohexandiisocyanate, aromatiepolyisocyanate such as methylbenzenediisocyanate, diphenylmethanediisocyanate, phenylenediisocyanate, dimethyldiphenylmethanediisocyanate, dianidinediisocyanate, xylenediisocyanate, tetramethylxylenediisocyanate, naphthalenediisocyanate, dimethyltriphenylmethanetetraisocyanate, triphenylmethanetrisocyanate, tris(isocyanatephenyl) thiophosfate and polymericdiphenylmethanediisocyanate, or modification of these such as allophanate modification, biuret modification, isocyanurate modification, carbodiimide modification, prepolymer modification, uretoninine modification, blockisocyanate and acylureadiisocyanate. In present invention, it can use only one kind of said isocyanate ingredient, also it can use by blending more than two kinds of said isocyanate ingredient.

Especially, in present invention, as isocyanate ingredient methylbenzene diisocyanate (TDI-80, TDI-65), crude-diphenyl methane diisocyanate (Crude-MDI). In particularly, it can explain Takenate 80 (a brand name) made by Mitui Takeda chemical Inc.

Further, compounding quantity of isocyanate ingredient may as same as producing usual polyurethane form, in particularly, usually it may adjust index to become 60~130, to become 80~120 is desirable against polyol ingredient 100 part by weight.

As long as used in producing of polyurethane form, foaming agent can use any foaming agent. In particularly, it can explain fleon system compound such as tricholorofluoromethane, methylenechloride and dichlorodifluoromethane, or heavy particulate sodium carbonate and particulate ammonium carbonate, and to use water or blend of water and low boiling point organic compound such as methylene chrolide is desirable. In present invention, it can use only one kind of said foaming agent, also it can use by blending more than two kinds of said foaming agent.

Further, compounding quantity of foaming agent may as same as producing usual polyurethane form, in particularly, usually it may adjust index to become 1.0~6.0 part by weight, to become 1.8~5.0 part by weight is desirable against polyol ingredient 100 part by weight.

As long as used in producing of polyurethane form, foaming agent can use any catalyst. In particularly, it can explain tin system such as dibutyltingelaurate, dibtiltingeacetate, stanasoleate, tertiary amine system catalyst such as, tripropylamine, triethylendiamine, dimethylethanolamine, triethylamine, tetramethylhexamethylenediamine, N-methylmorpholine and N-ethylmorpholine, or well-known urethane catalyst, for example, such as organometal and organic acid. In present invention, it can use only one kind of said catalysts, also it can use by blending more than two kinds of said catalysts.

Further, compounding quantity of catalyst may as same as producing usual polyurethane form, in particularly, usually it may adjust to become 0.01~5.0 part by weight, to become 0.5~3.0 part by weight is desirable against polyol ingredient 100 part by weight.

In present invention, each ingredient except for above mentioned, it can compound each time on demand chain extender such as polyhydric alcohol such as ethylene glycol, diethylene glycol, propylene glycol, 1,4-butanediol, 1,5-pentanediol, methyl pentanediol, 1,6-hexanediol, trimethylolpropane, glycerol, pentaerythritol, diglycerol, dextlos and sorbitol and ahpfaticmultivelenceamine such as ethylenediamine and hexamethylenediamine and alkanordamine such as aromaticmultivelenceamine, diethanolamine, triethanolamine and diisopropanolamine, plasticizer such as dibasic acid ester such as dioctylajipete and dibutylmaleit alkyl phosphoric acid ester such as trioctylphosfate and tributylphosfate halogenation alkyl phosphoric acid ester such as tricchloroethylphosfate aromatic phosphoric acid ester such as crejilediphenylphosfate, flame retardant such as tris(2-chloroethyle) phosfate, tris(2,3-dibromopropyl)phosfate and tris(dichloropropyl)phosfate and surfactant such as silicone system surface active agent. Further, each ingredient such as carbamide, organic powder such as thiocarbamide metal hydride, minerals powder such as antimony trioxide, colorant such as pigment or color, talc, graphite, glass staple, other inorganic extender, organic solvent, antibacterial agent, bacteriostat, antioxidant, ultraviolet absorbent and hydrolysis inhibitor can be compounded each time voluntary.

As carbon powder used in present invention, any carbon powder can be used when its particle diameter is over 0.01 $\mu$m, further, in present invention, the charcoal powder that has particle diameter over 500 $\mu$m also can be used.

In present invention, the particle diameter of carbon powder is not restricted particularly, when it is over 0.01 $\mu$m, but in the case of using below 1 $\mu$m carbon powder, particle diameter of carbon powder on carbon black powder is 0.01~1 $\mu$m, 0.01~0.8 $\mu$m is preferable and 0.05~0.5 $\mu$m is more preferable. Also, in the case of compounding 1~50 $\mu$m carbon powder, 10~400 $\mu$m of particle diameter is preferable and 100~300 $\mu$m is more preferable. Further, in the case of using carbon powder that has particle diameter over 500 $\mu$m is 500~2000 $\mu$m, 600~1500 $\mu$m is preferable and 750~1000 $\mu$m is more preferable.

In particularly, for the carbon powder used in the present invention, either of white coal obtained by that material wood is burned at 750~1200° C. and is carbonized at 350~520° C. or black coal obtained by that material wood is burned at 400~750° C. and is carbonized at 250~450° C. can be used preferably. For example, as white coal, carbon that material wood is oak kind or Japanese oak kind belonging to the beech family (Fagaceae), Japanese oak genus (Quercus), such as Bintyotan that material wood is Ubamegashi (Quercus Phillyraeoides) burned around 1200° C. or carbon that material wood is conifer, such as a Japan cedar (*Cryptomeria japonica*), a Japanese cypress (*Chamaecyparis obtusa*), a Japanese red pine (*Pinus densiflora*), a Japanese black pine (*Pinus thunbergii*), can be exemplified. Moreover, as black coal, carbon that material wood is Kunugi (*Quercus acutissima*), Konara (*Quercus serrta* Thunb), etc. can be exemplified. Furthermore, carbon using the bamboos belonging to the rice plant family (Gramineae), carbon black or activated carbon can be used preferably.

Especially, it is desirable to use blend of charcoal, bamboo carbon and carbon black. The reason is that when compounding large quantity of carbon and bamboo carbon, sometimes foaming is alienated, however by adding suitable amount of carbon black, the foaming is not alienated, and suitable foaming condition can be maintained.

Compound ratio of carbon and bamboo carbon, and carbon black is not restricted particularly, but in weight ratio, carbon and/or bamboo carbon: carbon black=1:0.5~5, 1:1~3 is preferable and 1:1.5~2.5 is more preferable.

Compound quantity of carbon powder is 0.01~30 weight % against total compound ingredient, 0.1~20 weight % is preferable, and 5~10 weight % is more preferable. This is because, in the case of compound quantity of carbon powder is below 0.01 weight %, effect by compounding carbon powder can not be obtained, also in the case of compound quantity of carbon powder is over 30 weight %, sometimes dispersibility is inferiorly and foaming is not done good, so neither cases are not desirable.

Percentage of foaming of produced low impact resilience polyurethane form is not restricted particularly, but to be 50~90% is desirable. Also, percentage of impact resilience is below 30%, 0~20% is preferable and 0~15% is more preferable.

Further, in present invention, a kind of low impact resilience polyurethane form is not restricted. Furthermore, in present invention, it is desirable to be a low impact resilience polyurethane form adjusted so as to glass conversion cause at least 0~60° C. of thermal condition, especially to be a low impact resilience polyurethane form adjusted so as to firing pressure return time be below 20 seconds in 20° C. of temperature condition. The reason is that since the low impact resilience is excellent by adjusting the firing pressure return time to be below 20 seconds in 20° C. of thermal condition, for example, in the case of using it as cushion material, it can obtain soft and comfortable cushion, excellent deodorization property and hygroscopicity. Also, firing pressure return time is indicated the time until restoration to thickness since removing a load after maximum compressed specimen of 50×380×380 (mm) by test bar (length 10 cm, diameter 25 mm) under a specific thermal condition.

Further, in the case of mold form, it is desirable that the firing pressure return time is below 20 seconds and in the case of slab form, it being below 10 seconds is desirable.

Adjusting method of the low impact resilience polyurethane form is not restricted particularly, for example, it can adopt any well-known methods such as using polyol ingredient that average molecular weight is 400~2000 and average organoleptic base is 2.0~3.5, using polyol ingredient consists of low molecular weight polyol ingredient 20~70 part by weight of 300~500 molecular weight and high molecular weight polyol ingredient 80~30 part by weight of 1500~8000, or compounding plasticizer and melamine resin. Also, in present invention, it may better to adjust coefficient of viscosity of polyol ingredient 400~600 cp, 450~550 cp is desirable. Further, when compounding carbon powder the low impact resilience polyurethane form tends to be hard and also its firing pressure return time is fast. It is better to add plasticizer to prevent this.

Figure 3:
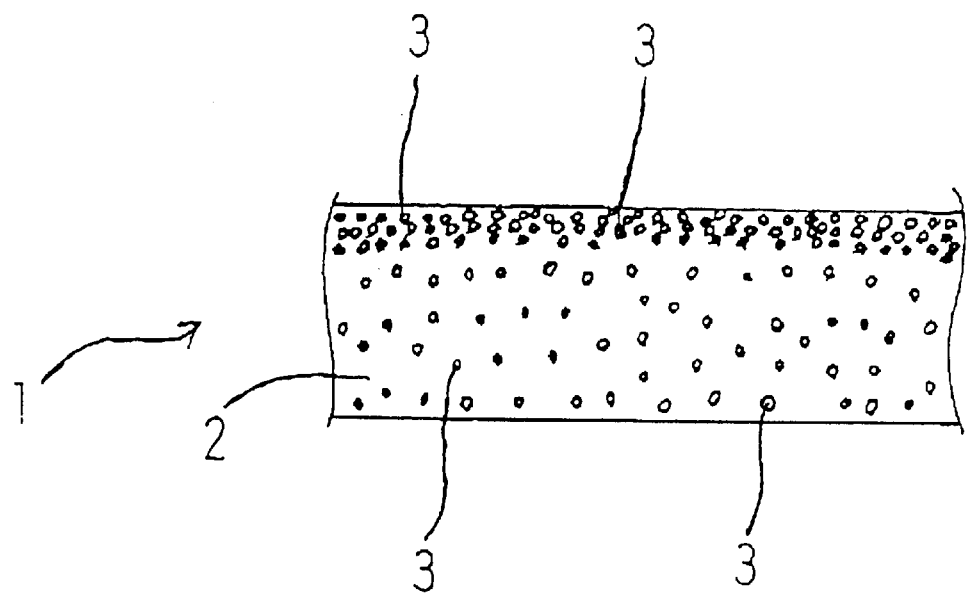
FIG. 3 is a section view of low impact resilience polyurethane form that contains carbon powder and relates to present invention.

The feature of low impact resilience polyurethane form containing carbon powder that relates present invention is as section view shown in FIG. 1, in the low impact resilience polyurethane form (2) adjusted from ingredient as mentioned above the carbon powder (3) is dispersed and maintained so as to be uniformity. Also, the section view shown in FIG. 3, the carbon powder (3) dispersed and maintained in low impact resilience polyurethane form (2) is intensively maintained by its surface is a feature.

The low impact resilience polyurethane form containing carbon powder that relates present invention is excellent deodorization property and hygroscopicity because of the carbon powder absorbs offensive odor and moisture in low impact resilience polyurethane form. Also, since it surpasses the hygroscopicity, it can maintain an even humidity so it surpasses mildewproof and tick-proof.

Further, besides offensive odor and moisture in low impact resilience polyurethane form, since it can absorb offensive odor and moisture containing in air that passes the low impact resilience polyurethane form, for example, in the case of using the low impact resilience polyurethane form containing carbon powder that relates present invention as cushion material of sheet for car, it can decrease offensive odor peculiar to cars.

Furthermore, carbon powder has far infrared radiation effect, for example, when using this low impact resilience polyurethane form as bedding, it can be heighten heat retaining property.

The low impact resilience polyurethane form containing carbon powder that relates present invention, the carbon powder is dispersed and maintained not only on the surface of the low impact resilience polyurethane form but also in it, so compared with case of clustered on one side and maintained, specific surface of the carbon powder increases and it can be heighten deodrizarion ability and hygroscopicity.

Also, in low impact resilience polyurethane form containing carbon powder as usual, particle diameter of charcoal powder was 50~500 μm and short, it needed to add special pigment because even though compounded fixed quantity carbon powder it did not color black sufficiently. On the contrary, the low impact resilience polyurethane form containing carbon powder that relates present invention is different as usual, it can contain carbon powder even if its particle diameter is over 500 μm, in this case, it can color black only by using the carbon powder without using special pigment.

The low impact resilience polyurethane form containing carbon powder that relates present invention can be used in many ways, especially by hoping its excellent deodorization property and hygroscopicity, it can be used suitable as bedding such as futon and pillow, cushion material such as sitting part of chair, floor material, wall material.

Next, a suitable producing method of the low impact resilience polyurethane form containing carbon powder that relates present invention as mentioned above will be explained.

A suitable producing method of the low impact resilience polyurethane form containing carbon powder that relates present invention is explained depending on the particle diameter.

First, in the case of particle diameter is 0.01~1 μm, when polyol ingredient and isocyanate ingredient are blended, these ingredients are simultaneously blended, heated, foamed and molded. By blending simultaneously polyol ingredient and isocyanate ingredient and carbon powder, it can foam suitably without catalyst is not absorbed in carbon powder.

Showing an example of this producing method, first, in the case of solid, both of polyol ingredient and isocyanate ingredient are heated and melted. Heating temperature of this is as same as temperature in usual producing of low impact resilience polyurethane form, in particularly, it is 50~80° C. Also, being pressure reduction circumstance on demand, dehydration and defoaming are done.

Next, a catalyst, foaming agent or other addition agent are blended in polyol ingredient. Temperature of this is as same as temperature in usual producing of low impact resilience polyurethane form, in particularly, it is 15~60° C.

Finally, when blending polyol ingredient blended various addition agent and isocyanate ingredient, after compounded carbon powder simultaneously, by molding after heating and foaming, the low impact resilience polyurethane form containing carbon powder that relates present invention can be made. Heating temperature is about 90~250° C.

Next, producing method of a case of a particle diameter is over 1 μm is explained. The feature of this producing method is that after dispersing carbon powder by blending previously in polyol ingredient, it is blended with isocyanate ingredient then heated, foamed and molded.

This is because that after dispersing carbon powder by blending previously in polyol ingredient, blending with isocyanate ingredient then heating and foaming, the carbon powder is not maintained on one side in low impact resilience polyurethane form, it is dispersed and maintained in low impact resilience polyurethane form.

Figure 2:
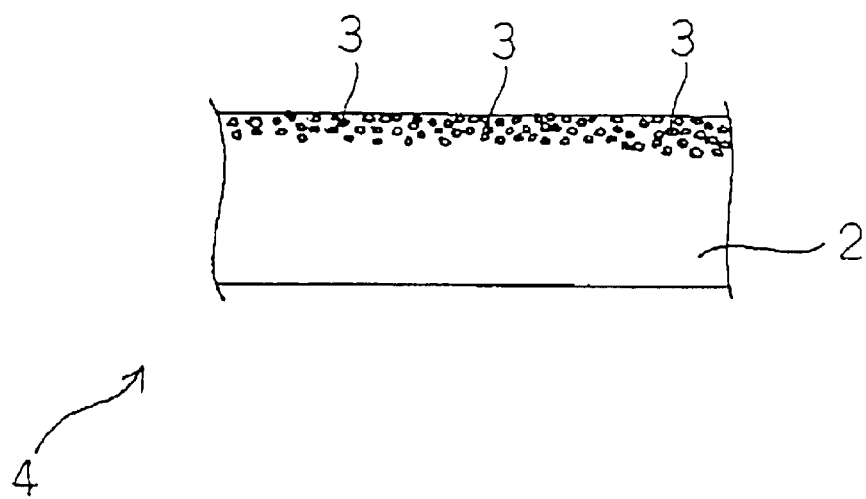
FIG. 2 is a section view of low impact resilience polyurethane form that contains carbon powder and produced by producing as usual.

On the contrary, in the case of compounding the carbon powder simultaneously when blending polyol ingredient and isocyanate ingredient like usual producing method, when particle diameter of the charcoal powder was 50~500 μm, it was dispersed and maintained in low impact resilience polyurethane form, but when the particle diameter was over 500 μm, the carbon powder (3) was not dispersed and maintained in low impact resilience polyurethane form (2) like section view shown in FIG. 2, sometimes the carbon powder (3) dropped from low impact resilience polyurethane form (2) because it maintained on one side.

That is, if the carbon particle diameter is over 1 μm, even if any length of particle diameter of the carbon powder, the low impact resilience polyurethane form can be produced the carbon powder without dropping from the low impact resilience polyurethane form and without effecting grading of the carbon powder.

Showing an example of this producing method, first, in the case of solid, both of polyol ingredient and isocyanate ingredient are heated and melted. Heating temperature of this is as same as temperature in usual producing of low impact resilience polyurethane form, in particularly, it is 50~80° C. Also, being pressure reduction circumstance on demand, dehydration and defoaming are done.

Next, a catalyst, foaming agent or other addition agent are blended in polyol ingredient. Further, in the present invention, the carbon powder is compounded in polyol ingredient previously, and it dispersed uniformly. Temperature of this is as same as temperature in usual producing of low impact resilience polyurethane form, in particularly, it is 15~60° C.

Finally, blending polyol ingredient blended various addition agent and isocyanate ingredient, by molding after heating and foaming, the low impact resilience polyurethane form containing carbon powder that relates present invention can be made. Heating temperature is about 90~250° C.

In this producing, by blending and foaming isocyanate ingredient and polyol ingredient that the carbon powder is compounded previously and dispersed so as to be uniformly, if the particle diameter is over 1 μm, even if any length of particle diameter of the charcoal powder, the low impact resilience polyurethane form can be produced that the charcoal powder is dispersed without maintaining one side and maintained. When using the charcoal powder that particle diameter is over 500 μm, shown in section view of FIG. 3, the charcoal powder is desirable feeling so as to concentrate it on the surface of the low impact resilience polyurethane form with it dispersing in the low impact resilience polyurethane form.

Also, producing method of the low impact resilience polyurethane form containing carbon powder that relates present invention can be adopted suitably both of discontinuous or continuous method.

Embodiment

The following is to explain the embodiments of the present invention. However, the present invention is not particularly restricted to these embodiments.

(Preparation of Specimen 1)

Each specimen of embodiment 1~4 and comparison example 1 is prepared by composition shown in table 1. The preparation method is that first, in polyol ingredient, after compounded ingredients except for isocyanate ingredient previously, and then this polyol ingredient and isocyanate ingredient are blended and reacted. Each specimen is prepared by heating 10 minutes and maturing under condition of 60~75° C. in furnace. As polyol ingredient, Boranol V 3022 J (a brand name) made by Dow Polyurethane Nihon Inc and MN 700 (a brand name) made by Mitui Takeda chemical Inc were used by equivalence blending. Also, as isocyanate ingredient, methylbenzene diisocyanate (TDI-80) was used. As catalyst, stannous octate, and as carbon powder, Bintyotan are used respectively.

(Preparation of Specimen 2)

Except for using carbon that has particle diameter below 1 μm and carbon black that has particle diameter below 1 μm as carbon powder by equivalence blending, Specimen of embodiment 5 was prepared by the following method as same composition as the composition of embodiment 1 in table 1. As a preparation method, first, after blending previously carbon powder and ingredients except for isocyanate ingredient in polyol ingredient, this polyol ingredient, isocyanate ingredient and carbon powder were simultaneously blended and responded. Under the condition of 60~75° C. in furnace, said responded blend was prepared by heating 10 minutes and matured.

(Test Example; Measurement of Hardness and Firing Pressure Return Time)

Hardness of the each specimen of embodiment 1~4 and comparison example 1 as mentioned above are measured based on the method prescribed in JIS-K6400. That is, by using testing machine installed 200 mm φ pressurization disc, weightings is measured that specimen of 50×380×380 (mm) was dummy compressed to 75% thickness before pressurization, and then compressed to 25% thickness to original thickness by velocity 100 mm per minutes.

Also, after each specimen of embodiment 1~4 and comparison example 1 as prepared above under temperature condition 20° C. is added fixed load, and then removed this load, time (firing pressure return time) that a hollow formed by load returns until the situation without adding any load is measured. The result is shown in table 1.

Producing the low impact resilience polyurethane form containing carbon powder that relates present invention can wide range diameter of carbon powder disperse and

TABLE 1

|  | Embodiment 1 | Embodiment 2 | Embodiment 3 | Embodiment 4 | Comparison Example 1 |
|---|---|---|---|---|---|
| Polyol ingredient (part by weight) | 100 | 100 | 100 | 100 | 100 |
| Isocyanate ingredient (index) | 100 | 100 | 100 | 100 | 100 |
| Water (part by weight) | 2.0 | 2.0 | 2.0 | 2.0 | 2.0 |
| Silicone Surfactant (part by weight) | 1.0 | 1.0 | 1.0 | 1.0 | 1.0 |
| Catalyst (part by weight) | 0.4 | 0.4 | 0.4 | 0.4 | 0.4 |
| Frame retardant (part by weight) | 12 | 12 | 12 | 12 | 12 |
| Black pigment (part by weight) | 2.0 | 2.0 | 2.0 | 1.8 | — |
| Carbon powder (0.5 mm diameter) (part by weight) | — | 0.5 | — | 0.3 | — |
| Carbon powder (200 mesh) (part by weight) | 0.5 | — | 0.5 | — | — |
| Hardness (N/314 cm$^2$) | 1.97 | 2.01 | 1.75 | 2.54 | 2.15 |
| Firing pressure return time(s) | 25 | 21 | 36 | 16 | 19 |

As the result of table 1, low impact resilience polyurethane form containing carbon powder has almost as same as property with low impact resilience polyurethane form does not contain carbon powder.

Also, in specimen of each embodiment, the carbon powder is dispersed and maintained in low impact resilience polyurethane form. Further, specimen of embodiment 5 has almost same property with low impact resilience polyurethane form that does not contain carbon powder.

The following is to explain formula example of the low impact resilience polyurethane form containing carbon powder that relates present invention.

| (Formula example 1; softpolyurethane slab form) | |
|---|---|
| Average molecular quantity 3000 polyether polyol | 100.0 part by weight |
| Methylbenzene diisocyanate | 53.7 part by weight |
| Water | 4.3 part by weight |
| Triethylene diamine 33% dipropylene solution | 0.3 part by weight |
| Silicone surfactant | 1.0 part by weight |
| Stannous octate | 0.32 part by weight |
| Carbon powder | 20.0 part by weight |
| (Formula example 2; softpolyurethane slab form) | |
| Polyester plyol | 100.0 part by weight |
| Methylbenzene diisocyanate | 45.4 part by weight |
| Water | 3.6 part by weight |
| N-ethyl morpholine | 1.9 part by weight |
| Foaming assistant | 0.3 part by weight |
| Silicone surfactant | 1.0 part by weight |
| Carbon powder | 25.0 part by weight |
| (Formula example 3; softpolyurethane mold form) | |
| Polyether polyol | 100.0 part by weight |
| Methylbenzene diisocyanate | 100 (index) |
| Water | 3.0 part by weight |
| N-ethyl morpholine | 0.2 part by weight |
| Octyl acid tin | 0.1 part by weight |
| Silicone surfactant | 1.0 part by weight |
| Carbon powder | 20.0 part by weight |

As detailed above, since the carbon powder is dispersed and maintained, the low impact resilience polyurethane form containing carbon powder that relates present invention surpasses in deodrization property and hygroscopicity. Also, it can restrain outbreak of mold and tick it, further it can expect far infrared radiation effect. Moreover, since the carbon powder is dispersed and maintained in low impact resilience polyurethane form, low impact resilience polyurethane form looks beauty.

maintain, and the contained carbon powder can not fall from the low impact resilience polyurethane form.

What is claimed is:

1. Low impact resilience polyurethane foam comprising of isocyanate ingredient, carbon powder and polyol ingredient wherein said polyol ingredient is a mixture of polyol which is average functional base is 2 to 4 and hydroxyl value is 30 to 60 mgKOH/g and polyol which is average functional base is 2 to 4 and hydroxyl value is 200 to 270 mgKOH/g and wherein firing pressure return time is less than 36 seconds in 20 centigrade.

2. Low impact resilience polyurethane foam comprising of isocyanate ingredient and polyol ingredient and carbon powder that has over 1 μm particle diameter is dispersed previously wherein said polyol ingredient is a mixture of polyol which is average functional base is 2 to 4 and hydroxyl value is 30 to 60 mgKOH/g and polyol which is average functional base is 2 to 4 and hydroxyl value is 200 to 270 mgKOH/g and wherein firing pressure return time is less than 36 seconds in 20 centigrade.

3. A low impact resilience polyurethane foam comprising of that isocyanate ingredient, polyol ingredient and carbon powder that has 0.01 to 1 μm particle diameter are blended simultaneously wherein said polyol ingredient is a mixture of polyol which is average functional base is 2 to 4 and hydroxyl value is 30 to 60 mgKOH/g and polyol which is average functional base is 2 to 4 and hydroxyl value is 200 to 270 mgKOH/g and wherein firm pressure return time is less than 36 seconds in 20 centigrade.

4. Low impact resilience polyurethane foam sets forth in claim 1 wherein said carbon powder is at least one of Bintyotan and carbon black.

5. Low impact resilience polyurethane foam sets forth in claim 2 wherein said carbon powder is at least one of Bintyotan and carbon black.

6. Low impact resilience polyurethane foam sets forth in claim 3 wherein said carbon powder is at least one of Bintyotan and carbon black.

7. Low impact resilience polyurethane foam sets forth in claim 1 wherein said polyol ingredient is consisted of polyol which is 34 to 75 weight percent, average function base is 2 to 4 and hydroxyl value is 30 to 60 mgKOH/g and polyol which is 25 to 66 weight percent, average functional base is 2 to 4 and hydroxyl value is 200 to 270 mgKOH/g.

8. Low impact resilience polyurethane foam sets forth in claim 2 wherein said polyol ingredient is consisted of polyol which is 34 to 75 weight percent, average functional base is 2 to 4 and hydroxyl value is 30 to 60 mgKOH/g and polyol which is 25 to 66 weight percent, average functional base is 2 to 4 and hydroxyl value is 200 to 270 mgKOH/g.

9. Low impact resilience polyurethane foam sets forth in claim 3 wherein said polyol ingredient is consisted of polyol which is 34 to 75 weight percent, average functional base is 2 to 4 and hydroxyl value is 30 to 60 mgKOH/g and polyol which is 25 to 66 weight percent, average functional base is 2 to 4 and hydroxyl value is 200 to 270 mgKOH/g.

10. Low impact resilience polyurethane foam sets forth in claim 1 wherein compound quantity of carbon powder is 0.01 to 30% of total compound ingredient.

11. Low impact resilience polyurethane foam sets forth in claim 2 wherein compound quantity of carbon powder is 0.01 to 30% of total compound ingredient.

12. Low impact resilience polyurethane foam sets forth in claim 3 wherein compound quantity of carbon powder is 0.01 to 30% of total compound ingredient.

13. Low impact resilience polyurethane foam sets forth in claim 4 wherein a compound ratio of Bintyotan and carbon black is from about one part Bintyotan to from about 0.5 to about 5.0 of carbon by weight.

14. Low impact resilience polyurethane foam sets forth in claim 5 wherein compound ratio of Bintyotan and carbon black is from about one part Bintyotan to from about 0.5 to about 5.0 of carbon by weight.

15. Low impact resilience polyurethane foam sets forth in claim 6 wherein compound ratio of Bintyotan and carbon black is from about one part Bintyotan to from about 0.5 to about 5.0 of carbon by weight.

16. A producing method of low impact resilience polyurethane foam wherein isocyanate ingredient and polyol ingredient that carbon powder which has over 1 μm particle diameter are blended, heated and foamed, and then molded wherein said polyol ingredient is a mixture of polyol which is average functional base is 2 to 4 and hydroxyl value is 30 to 60 mgKOH/g and polyol which is average functional base is 2 to 4 and hydroxyl value is 200 to 270 mgKOH/g and wherein firing pressure return time is less than 36 seconds in 20 centigrade.

17. A producing method of low impact resilience polyurethane foam wherein isocyanate ingredient, polyol ingredient and carbon powder that has particle diameter 0.01 to 1 μm are blended, heated and foamed simultaneously, and then molded wherein said polyol ingredient is a mixture of polyol which is average functional base is 2 to 4 and hydroxyl value is 30 to 60 mgKOH/g and polyol which is average functional base is 2 to 4 and hydroxyl value is 200 to 270 mgKOH/g and wherein firing pressure return time is less than 36 seconds in 20 centigrade.

* * * * *